United States Patent [19]

Schneider

[11] Patent Number: 5,718,032
[45] Date of Patent: Feb. 17, 1998

[54] METHOD OF JOINTING A FLEXIBLE TUBULAR COMPONENT TO THE END OF A MAIN COMPONENT, AND DEVICE FOR CARRYING OUT THE METHOD

[75] Inventor: Wolf-Dietrich Schneider, Holzgerlingen, Germany

[73] Assignee: Emporia Maschinen AG, Baar, Switzerland

[21] Appl. No.: 507,463

[22] PCT Filed: Dec. 16, 1993

[86] PCT No.: PCT/CH94/00238

§ 371 Date: Aug. 28, 1995

§ 102(e) Date: Aug. 28, 1995

[87] PCT Pub. No.: WO95/18328

PCT Pub. Date: Jul. 6, 1995

[30] Foreign Application Priority Data

Dec. 27, 1993 [EP] European Pat. Off. ............ 93120918

[51] Int. Cl.⁶ .................................................. B23P 11/02
[52] U.S. Cl. .................................. 29/450; 29/234; 29/235
[58] Field of Search ................................ 29/234, 235, 450

[56] References Cited

U.S. PATENT DOCUMENTS

| | | | |
|---|---|---|---|
| 1,322,843 | 11/1919 | Townsend | 29/235 |
| 2,381,748 | 8/1945 | Howe . | |
| 2,498,357 | 2/1950 | Breisch | 29/235 |
| 2,645,004 | 7/1953 | Dorner | 29/234 |
| 3,146,709 | 9/1964 | Bass et al. | 29/235 |
| 3,389,643 | 6/1968 | Lemcke et al. | 29/235 |
| 3,846,901 | 11/1974 | Lovett | 29/235 |
| 3,977,710 | 8/1976 | Ridenour . | |
| 5,031,297 | 7/1991 | Nelson | 29/234 |
| 5,072,500 | 12/1991 | Wagner | 29/235 |
| 5,114,523 | 5/1992 | Ammon et al. | 29/235 |

FOREIGN PATENT DOCUMENTS

| | | |
|---|---|---|
| 1562207 | 4/1969 | France . |
| 524009 | 6/1939 | United Kingdom . |

*Primary Examiner*—David P. Bryant
*Attorney, Agent, or Firm*—Cushman, Darby & Cushman IP Group of Pillsbury Madison & Sutro LLP

[57] ABSTRACT

A method for joining a pliable, tubular joining component to one end, which is, for example, conical, of a base component, including inserting the joining component into a workpiece holder, holding the base component by use of a gripping tool so that the joining component and the base component are aligned coaxially, moving the gripping tool and the workpiece holder towards each other, delivering compressed air into the workpiece holder via a compressed air delivery channel for the purpose of widening that end of the joining component facing the base component, and pushing the base component into the widened end of the joining component. A device for carrying out the method includes a workpiece holder, a movable gripping tool for holding the base component, and a compressed air delivery channel coaxial with respect to the joining component and the base component.

8 Claims, 2 Drawing Sheets

METHOD OF JOINTING A FLEXIBLE TUBULAR COMPONENT TO THE END OF A MAIN COMPONENT, AND DEVICE FOR CARRYING OUT THE METHOD

BACKGROUND OF THE INVENTION

The invention relates to a method for joining a pliable, tubular joining component to one end of a base component. The invention furthermore relates to a device for carrying out such a method.

The joining of so-called pliable, tubular components such as, for example, hoses or seals, represents a considerable obstacle to automation in the assembly sector. Such elongate and hollow components, which may possibly be (partly) curved or conical, are predominantly assembled by hand.

In the production of infusion equipment, a cylindrical or else conical transition piece made of latex rubber is pushed manually over one end of an infusion tube or infusion hose and an adaptor piece. This operation for joining the transition piece to the slightly larger joining member lasts for between 10 and 25 seconds, depending on the dexterity of the worker. By lubricating the joining members, for example with a water/alcohol mixture, the required assembly time can be reduced, although more than 4 seconds are still needed.

SUMMARY OF THE INVENTION

The invention is based on the object of providing a method which permits an automatic, quick and reliable operation for joining the abovementioned components.

The stated object is achieved according to the invention in that the following steps are performed:

- inserting the joining component into a workpiece holder,
- holding the base component by means of a gripping tool so that the joining component and the base component are aligned coaxially,
- moving the gripping tool and/or the workpiece holder towards each other, so that the distance between the gripping tool and the workpiece holder is reduced,
- delivering compressed air into the workpiece holder via a compressed air delivery means for the purpose of widening that end of the joining component facing the base component,
- pushing the base component into the widened end of the joining component.

The joining component is widened abruptly by the compressed air, so that the end of the base component can be pushed in. Thus, an automated joining operation is achieved which is assisted by compressed air and which is also suitable, for example, for base components whose conical end has in part a greater external diameter than the internal diameter of the pliable, tubular joining component. The assembly time is reduced to less than 2 seconds. It is no longer necessary to lubricate the members which are to be joined.

In a device for carrying out the method according to the invention the coaxial delivery of compressed air permits in a simple manner the widening of that end of the joining component facing towards the base component.

According to a preferred embodiment of the invention, in which the base component has a central recess, the compressed air is introduced into the workpiece holder via the central recess of the base component for the purpose of generating a compressive force which acts on that end of the joining component remote from the base component, is directed towards the base component and additionally shoots the joining component towards the base component and pushes it onto the latter. The widened part of the joining component in this case bears on the edge of the workpiece holder, so that the joining component is not pressed back again when the base component is pushed in. In this way, by means of the combination of widening and pressing, a still quicker and more reliable joining operation is obtained.

According to an embodiment of the invention, the gripping tool has a guide sleeve which surrounds the conical end of the base component with clearance. This sleeve prevents the pliable joining part from catching and as a result inflating like a balloon during joining. Thus, a more reliable joining operation is ensured.

BRIEF DESCRIPTION OF THE DRAWINGS

An illustrative embodiment of the invention is explained in more detail hereinbelow with reference to the drawings, in which.

DETAILED DESCRIPTION

Figure 1:
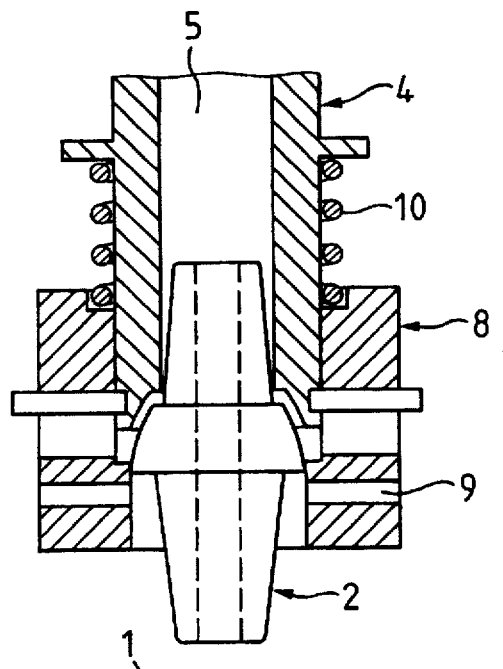
FIG. 1 shows a section through a first embodiment of the device according to the invention.
Figure 1:
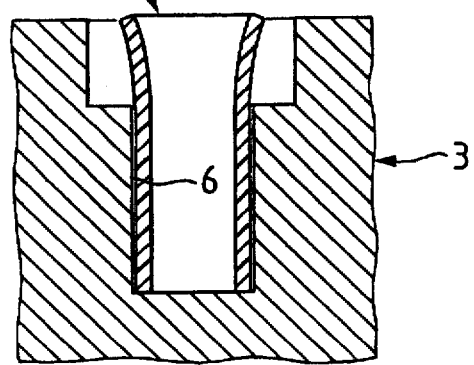

FIG. 1 shows a first embodiment of a device according to the invention for joining a pliable, tubular joining component 1 to a base component 2. The joining component 1 consists, for example, of latex rubber. The base component 2 has a central bore and is shaped cylindrically or conically, for example, at the end which is to be joined, the external diameter of the conical component being greater, at least in part, than the internal diameter of the joining component 1 which has not been shaped.

A workpiece holder 3 for holding the joining component 1 has a blind bore 6 with a cylindrical first area and a second area which faces the base component 2 and which is wider than the first area. The diameter of the lower area corresponds essentially to the external dimension of the joining component 1.

A gripping tool 4 for holding the base component 2 so that the joining component 1 and the base component 2 are aligned coaxially can be moved in the direction of the blind bore 6. A compressed air delivery means 5 is also provided, through which compressed air can be delivered in a manner known per se. The compressed air delivery means 5 is arranged for example centrally and axially in the gripping tool 4, as shown in FIG. 1. Thus, the compressed air can be guided through the central bore of the base component 2 into the blind bore 6 of the workpiece holder 3.

The gripping tool 4 has a guide sleeve 8 which surrounds the conical end of the base component 2 at least partly with clearance. This sleeve serves on the one hand to guide the compressed air into the blind bore 6 and on the other hand (mainly) to prevent the joining component 1 from catching and inflating like a balloon during the joining operation.

The guide sleeve 8 is provided with radial vent bores 9 so that the compressed air can escape. It is secured resiliently on the gripping tool 4, for example by means of a spring 10.

The joining operation according to the invention proceeds as follows: the joining component 1 is held with a play of about 0.1 mm in the lower area of the blind bore 6 of the workpiece holder 3, and the base component 2 is clamped in the gripping tool 4. As is shown, the blind bore 6 can be oriented vertically so that the force of gravity is utilized when the joining component 1 is taken up and held, but another orientation is also possible.

First, the gripping tool 4, which is oriented coaxially with respect to the joining component 1, lowers from above to a distance of about 8 mm from the upper edge of the workpiece holder 3 or the joining component 1. At this point, the compressed air is delivered. This flows through the central, axial compressed air delivery means 5 and the central bore of the base component 2 into the tubular joining component 1 located in the blind bore 6. That end of the joining component 1 facing the base component 2 is subsequently widened abruptly by the compressed air, and the base component 2 is at the same time pushed in by means of further lowering of the gripping tool 4.

Figure 2:
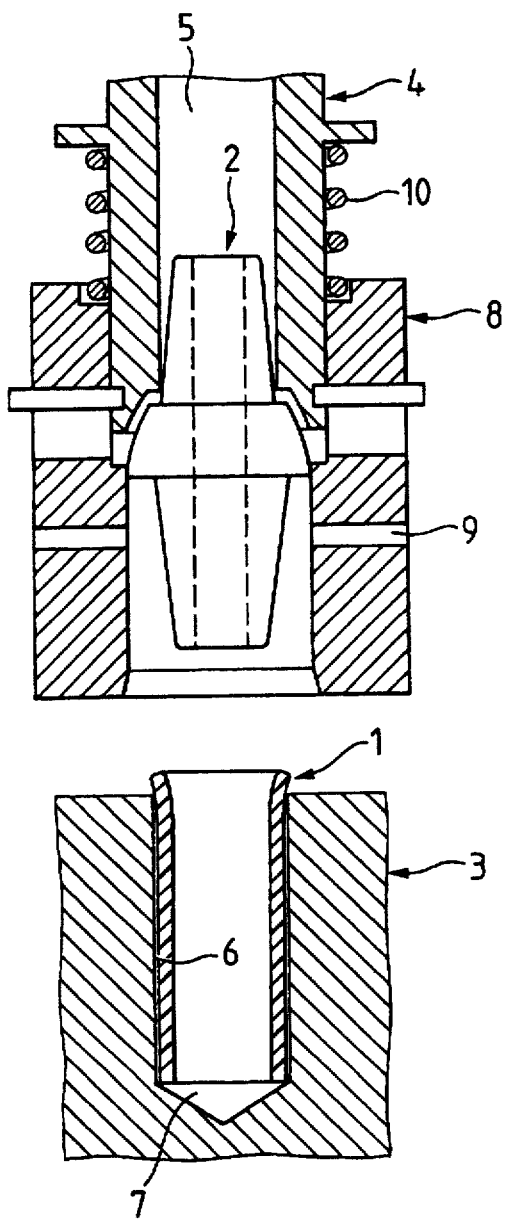
FIG. 2 shows a section through another embodiment of the device according to the invention in the standby phase.

Another device according to the invention for joining a pliable, tubular joining component 1 to a base component 2 is represented in FIG. 2. The base component 2 has a central bore and is shaped conically at the end which is to be joined, the external diameter of the conical component being greater, at least in part, than the internal diameter of the joining component 1 which has not been shaped.

The workpiece holder 3 for holding the joining component 1 is provided with a cylindrical blind bore 6 whose diameter and depth correspond essentially to the external dimensions of the joining component 1 and which additionally has a recess 7 at the closed end. The blind bore 6 holds the joining component 1 in such a way that the latter is guided with a play of, for example, about 0.1 mm on the outside and is received almost completely in the blind bore 6.

The additional recess 7 at the closed end of the blind bore 6 extends over almost the entire end surface of the cylindrical bore 6 and is of conical design, for example. The said recess serves, upon introduction of compressed air into the blind bore 6, to make the said air act on that end of the joining component 1 located at the closed end of the blind bore 6 and remote from the base component 2, and consequently in the direction of the open end of the blind bore 6.

In a further embodiment (not shown) of the device according to the invention, the compressed air delivery means 5 is arranged laterally on the gripping tool 4, in which case the compressed air is guided along the outer side of the conical end of the base component 2 into the blind bore 6 of the workpiece holder 3. This device is thus also suitable for joining a joining component 1 to a base component 2 which has no central bore.

The embodiment shown in FIG. 2 has many advantages: Since the compressed air is led through the open end (from above) into the blind bore 6, the overpressure builds up abruptly and mainly in the location where it is needed, namely at the closed, lower end of the blind bore 6. Here, the compressed air exerts the required axial force on the lower end of the joining component 1. In addition, upon the resulting emergence of the upper end of the joining component 1 from the blind bore 6, that part of the joining component 1 protruding above the workpiece holder 3 is further widened. This makes it easier to push the joining component 1 onto the base component 2.

In the standby phase (FIG. 2), the gripping tool 4, which is aligned coaxially with respect to the joining component 1, lowers from above to a distance of about 8 mm from the upper edge of the workpiece holder 3 or the joining component 1. The compressed air is delivered at this point. The said air flows through the central, axial compressed air delivery means 5, the central bore of the base component 2 and the tubular joining component 1 into the blind bore 6. Subsequently, not only is the upper part of the joining component 1 widened, but an overpressure develops also at the closed end of the blind bore 6.

The compressed air acts, by way of the conical recess 7, on the lower end surface of the joining component 1 at the closed end of the blind bore 6, so that the said component is shot upwards. That part of the joining component 1 which as a result protrudes above the workpiece holder 3 is then further widened by the compressed air.

Figure 3:
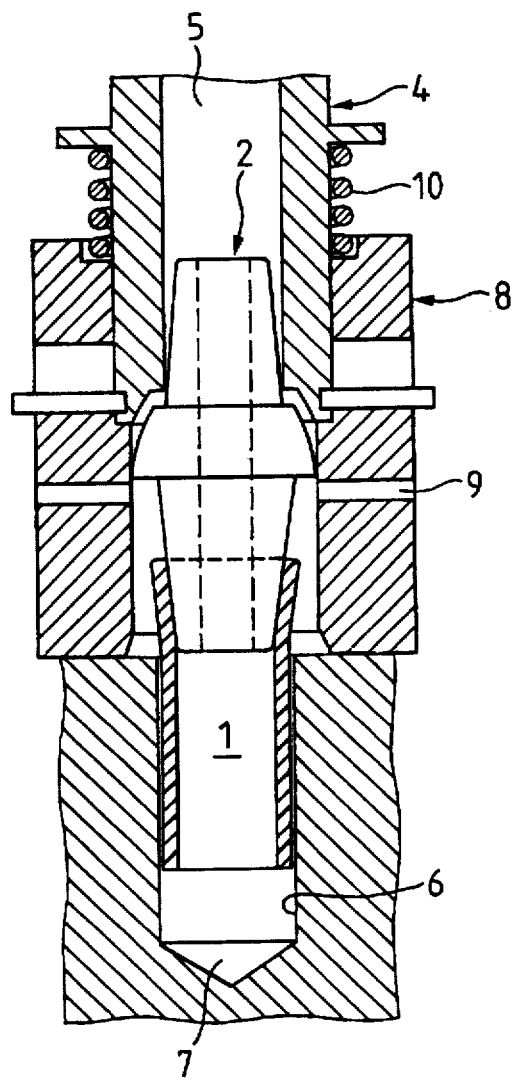
FIG. 3 shows a section corresponding to FIG. 2, but in the contact phase.

In the contact phase (FIG. 3), the gripping tool 4 moves further down with the guide sleeve 8 until the said sleeve sits on the workpiece holder 3 or settles resiliently on it. The conical end of the base component 2 is then pushed into the widened part of the joining component 1. By means of the conical shape of the base component 2, the frictional force increases here. At high joining speeds, the joining component 1 may tend to catch on the base component 2 at its end face, in which case, when caught, it inflates like a balloon. This is prevented, however, by the guide sleeve 8 which forces the compressed air to flow out laterally and upwards between the joining component 1 and the base component 2 and onwards through the radial vent bores 9. Catching of the joining component 1 is thus prevented, or, if catching has occurred, this is rectified, so that the joining operation is carried out reliably and completely.

The resilient fastening in this case ensures a tight fitting of the guide sleeve 8 on the workpiece holder 3 and thus assists the lateral upward flow of the compressed air.

Following the contact phase, the joined components 1 and 2 are pressed out of the gripping tool 4 with the aid of an ejector (not shown) in order subsequently to be further assembled. The device is then ready for the next joining operation.

Figure 4:
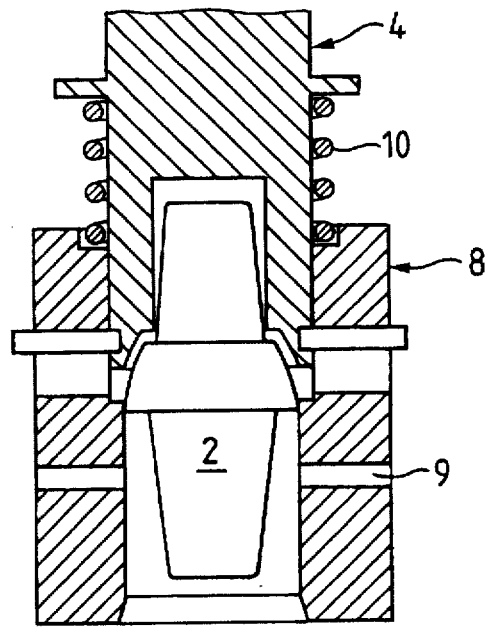
FIG. 4 shows a section through another embodiment of the device according to the invention.
Figure 4:
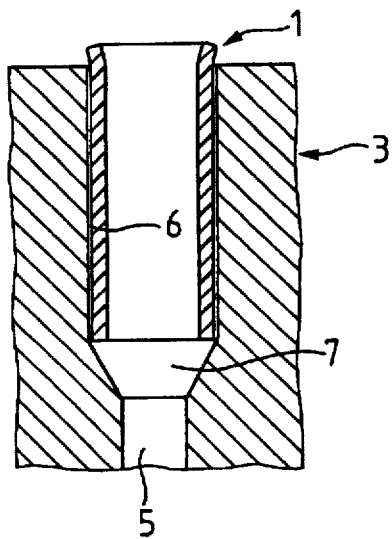

In a further embodiment (FIG. 4) of the device according to the invention, the compressed air delivery means 5 opens directly into the recess 7 of the workpiece holder 3. This embodiment too is therefore suitable for joining a joining component 1 to a conically shaped base component 2 which has no central bore.

I claim:

1. A device for mounting a joining component with a base component, comprising:

a workpiece holder for holding the joining component;

a movable gripping tool for holding the base component;

a compressed air delivery means coaxial with respect to the workpiece holder and the gripping tool;

at least one of said gripping tool and said workpiece holder being provided with means for conducting compressed air, delivered by said compressed air delivery means, into and out of the joining component;

the workpiece holder being provided with a cylindrical blind bore having a closed end, and which additionally has a recess at the closed end, and the compressed air delivery means being arranged in the gripping tool.

2. The device according to claim 1, wherein:

the recess is conically shaped.

3. A device for mounting a joining component with a base component, comprising:

a workpiece holder for holding the joining component;

a movable gripping tool for holding the base component;

a compressed air delivery means coaxial with respect to the workpiece holder and the gripping tool;

at least one of said gripping tool and said workpiece holder being provided with means for conducting compressed air, delivered by said compressed air delivery means, into and out of the joining component;

the gripping tool having a guide sleeve which surrounds the end of the base component, at least partly with clearance.

4. The device according to claim 3, wherein:

the guide sleeve has vent bores.

5. The device according to claim 3, wherein:

the guide sleeve is fastened resiliently on the gripping tool.

6. A method for joining a pliable, tubular joining component to one end of a base component, comprising the following steps:

inserting the joining component into a workpiece holder;

holding the base component by use of a gripping tool so that the joining component and the base component are aligned coaxially, with axial spacing between the base component and a closest end of the joining component;

reducing the axial distance between the gripping tool and the workpiece holder;

widening said end of the joining component only by delivering compressed air into the workpiece holder via a compressed air delivery channel;

directing compressed air out of said joining component during the widening of said end of the joining component;

pushing the base component into the widened end of the joining component after beginning to widen said end of said joining component; and the base component having a central recess; and said delivering of the compressed air into the workpiece holder being performed via said central recess of the base component.

7. A method for joining a pliable, tubular joining component to one end of a base component, comprising the following steps:

inserting the joining component into a workpiece holder;

holding the base component by use of a gripping tool so that the joining component and the base component are aligned coaxially, with axial spacing between the base component and a closest end of the joining component;

reducing the axial distance between the gripping tool and the workpiece holder;

widening said end of the joining component by delivering compressed air into the workpiece holder via a compressed air delivery channel, pushing the joining component with its widened said end onto the base component by causing said compressed air to act as a compressive force on an end of the joining component remote from the base component, whereby said compressive force is directed towards the base component in order to shoot the joining component axially towards the base component.

8. The method according to claim 7, in which:

the base component has a central recess, and said delivering of the compressed air into the workpiece holder is performed via said central recess of the base component.

* * * * *